United States Patent [19]

Aström

[11] 4,214,599

[45] Jul. 29, 1980

[54] DEVICE FOR USE IN CONNECTION WITH TAPPING OFF FLUID FROM OR FILLING FLUID INTO A CONTAINER

[76] Inventor: Erik J. H. Åström, Kärrvägen 26, 135 00 Tyresö, Sweden

[21] Appl. No.: 947,091

[22] Filed: Sep. 29, 1978

[30] Foreign Application Priority Data

Sep. 29, 1977 [SE] Sweden ................................ 7710928

[51] Int. Cl.[2] ............................................. F16L 55/10

[52] U.S. Cl. ........................................ 137/15; 138/89; 220/321; 220/323

[58] Field of Search ............... 137/317, 319, 320, 321, 137/15; 138/89; 220/320, 321, 323, 325; 292/256.65, 256.69

[56] References Cited

U.S. PATENT DOCUMENTS

| | | | |
|---|---|---|---|
| 800,771 | 10/1905 | Terney | 137/321 |
| 972,384 | 10/1910 | Kellar et al. | 137/321 |
| 1,483,964 | 2/1924 | Abramovitz | 137/319 |
| 2,075,383 | 3/1937 | Vaughn | 220/321 |
| 2,186,925 | 1/1940 | Hooper et al. | 137/321 |
| 2,187,838 | 1/1940 | Penick et al. | 137/319 |
| 3,103,293 | 10/1963 | Beutler | 220/321 |
| 3,637,257 | 1/1972 | Uncapher | 220/321 |
| 4,127,141 | 11/1978 | Ledonne et al. | 137/321 |

FOREIGN PATENT DOCUMENTS

| | | | |
|---|---|---|---|
| 504203 | 6/1920 | France | 137/319 |

*Primary Examiner*—Martin P. Schwadron
*Assistant Examiner*—G. L. Walton
*Attorney, Agent, or Firm*—Fleit & Jacobson

[57] ABSTRACT

A device for use in connection with tapping off fluid from or filling fluid into a container through an internally threaded tapping or filling hole in the container provided with an externally threaded generally cup-shaped plug having an outwardly open cavity in which a tool may be inserted for rotating the plug. The device comprises a bell-like housing and a tool for manually operating the plug from a position outside the housing. The tool comprises a shaft which extends slidably and rotatably through a portion of the housing opposite to the open end of the housing and which is provided with a handle at its outer end and with a plug holding and operating means at its inner end. The latter means includes an expansion mechanism adapted to be expanded into contact under pressure with portions of the side wall of the cavity of the plug upon insertion of the plug holding and operating mechanism into the cavity.

8 Claims, 4 Drawing Figures

DEVICE FOR USE IN CONNECTION WITH TAPPING OFF FLUID FROM OR FILLING FLUID INTO A CONTAINER

The present invention relates to a device for use in connection with tapping off fluid from or filling fluid into a container through an internally threaded tapping or filling hole in the container provided with an externally threaded generally cup-shaped plug having an outwardly open cavity in which a tool may be inserted for rotating the plug. More particularly, the invention relates to such a device of the kind comprising a bell-like housing which is adapted to be removably mounted with an open end thereof over the tapping or filling hole of the container and which is provided with an opening through which fluid may be fed into or discharged from the housing, and a tool for manually operating the plug from a position outside the housing, said tool comprising a shaft which extends slidably and rotatably through a portion of the housing opposite to the open end of the housing and which is provided with handle means at its outer end, while, at its inner end, it is provided with plug holding and operating means insertable into said cavity in the plug. A device of a similar type is previously known through French patent specification No. 504,203. However, a disadvantage of said known device is that it is restricted for use with containers of a very specific type having a specially designed plug for closing the tapping or filling hole of the container.

An object of the invention is to provide an improved device of the kind above specified which is adapted to be used with drums or similar containers of the kind widely used, inter alia within the petroleum industry and the chemical industry, and having internally threaded tapping holes, or bung holes, provided with externally threaded plugs, or bungs, of well-known standardized type.

According to the invention there is proposed a device of the kind initially specified, characterized in that said plug holding and operating means include expansion means adapted to be expanded into contact under pressure with portions of the side wall of the cavity of the plug upon insertion of the plug holding and operating means into said cavity.

The use of expansion means, as proposed by the invention, makes it possible in an easy and reliable manner to hold the plug firmly in position on the tool when removing the plug from the tapping hole.

The device may be provided with separate manually operable control means for actuating the expansion means. However, it may alternatively be provided with automatically operating control means for actuating the expansion means, preferably in response to a limited rotation of the handle means of the tool with respect to the plug.

Below, the invention will be described in further detail, reference being had, by way of example, to the accompanying drawing, in which.

Figure 1:
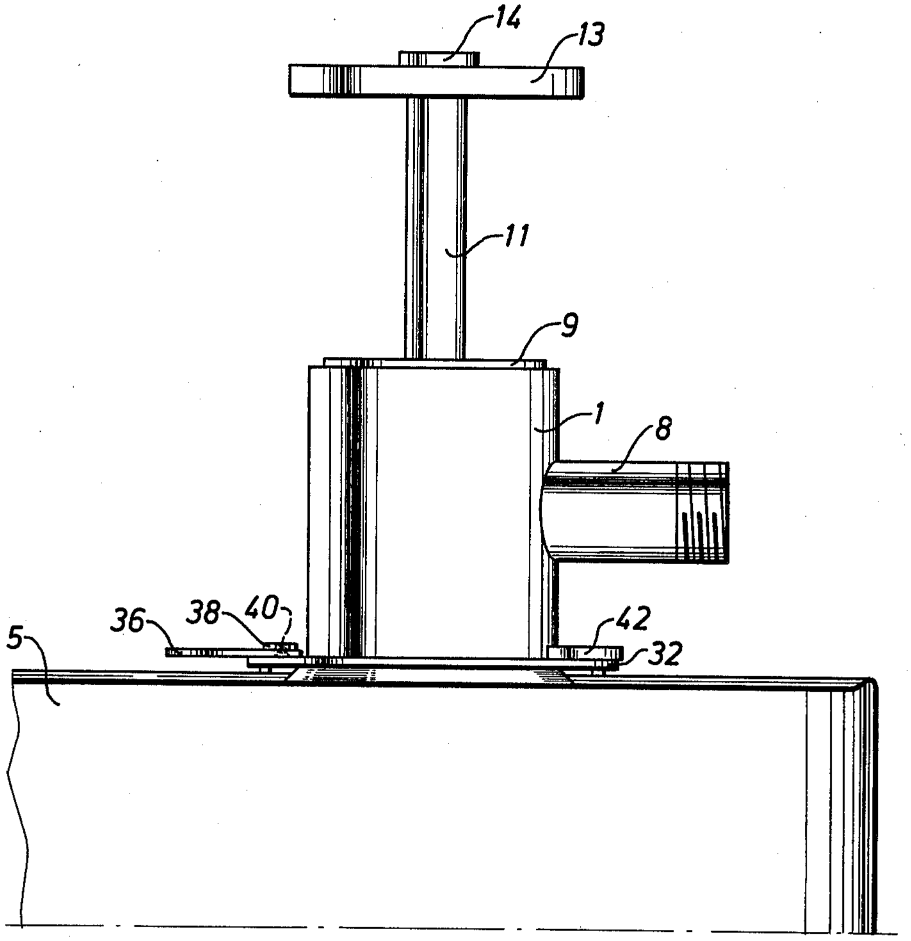
FIG. 1 is a side elevation of a device according to one embodiment of the invention, showing the device mounted over a tapping hole of a drum-shaped container.
Figure 2:
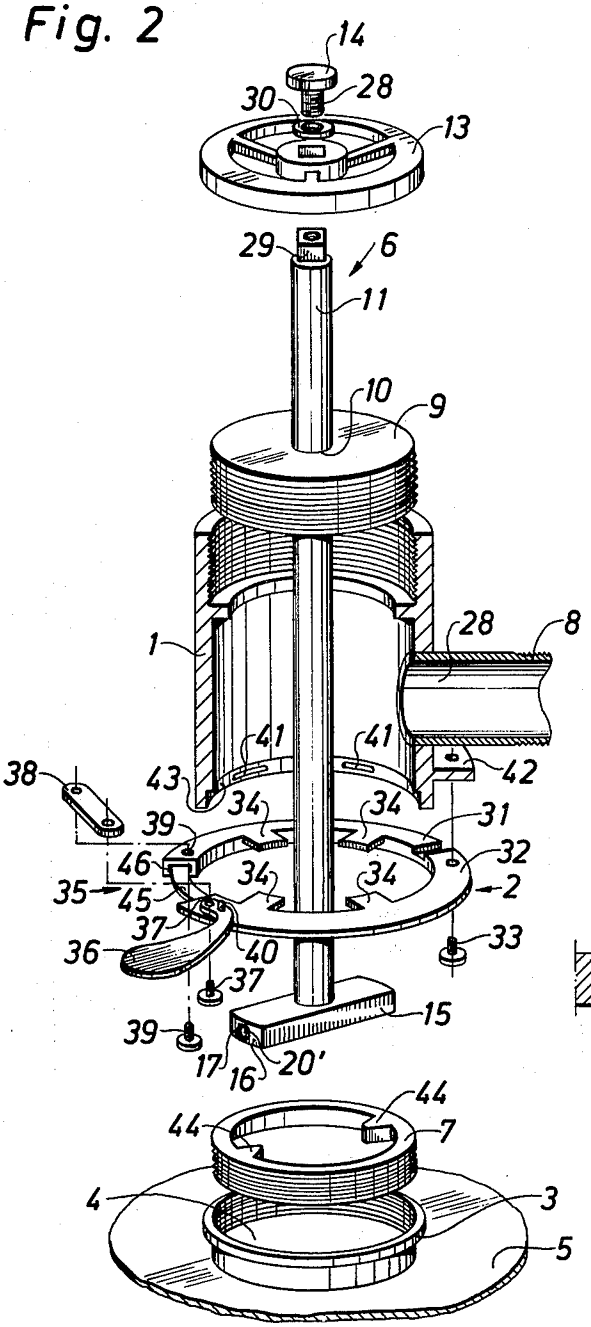
FIG. 2 shows an exploded view of the device according to FIG. 1.
Figure 3:
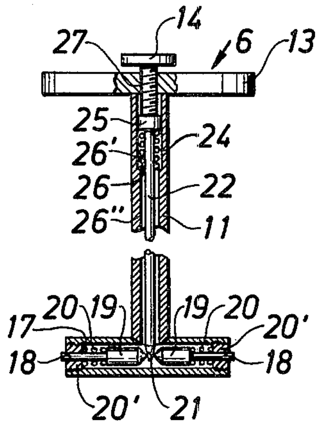
FIG. 3 is a sectional view showing a plug operating and holding tool of the device in greater detail, a portion of the shaft of the tool being cut away to facilitate easy illustration of the tool.

The device shown in FIGS. 1 and 2 comprises a bell-like housing 1 having an open end adapted to be mounted over a tapping and filling hole 4 in a drum 5 and to be locked in engagement with a flange 3, surrounding said hole, by means of a locking device 2. Reference numeral 6 generally designates a key, or tool, by which a plug 7 (shown in FIG. 2) may be threaded into and removed from the tapping hole 4 and by which the plug may be held and lifted from hole 4 within housing 1 to provide free passage for fluid from the tapping hole 4 to a discharge pipe 8 terminating in an opening in the wall of housing 1. At its upper end (as shown in FIGS. 1 and 2), housing 1 is closed by a circular threaded cover 9 provided with a central bore 10 through which a shaft 11 of key 6 extends slidably and rotatably. At the upper end of the key shaft 11, there is provided a handle 13, shaped as a handwheel, and a screw 14. At its lower end, the shaft 11 carries a key bit formed by a cross bar 15 having slightly rounded ends 16. The bar 15 is shaped so as to fit into the upwardly open cavity of the cup-shaped plug 7. A longitudinal bore 17 extends through bar 15. Said bore 17 contains two slidably pins received in opposite ends of the bore and consisting each of an outer shaft portion 18 and an inner enlarged head 19 having a rounded end surface. A compression spring 20 is provided around shaft portion 18 of each pin to act between a shoulder on head 19 and an inner end surface of a hollow screw plug 20' inserted in an internally threaded end portion of bore 17. A bevelled lower end portion 21 of an operating rod 22 cooperates with the inner rounded end surfaces of the two pin heads 19. Said rod 22 is spring biased in an upward direction by a compression spring 24 acting between an enlarged head 25 at the upper end of rod 22 and a shoulder 26 formed by an end surface of a bore 26' of enlarged diameter provided in the upper portion of key shaft 11. A longitudinal bore 26" of smaller diameter extends through the remaining part of shaft 11 to receive rod 22 slidably therein.

At its upper end the wider bore 26' is internally threaded (at 27) to receive the threaded shank 28 of screw 14 therein. By manually rotating screw 14 the operating rod 22 may be forced downwardly to move the two pins 18 in opposite outward directions into engagement with the side wall of the cavity provided in plug 7.

At its upper end, shaft 11 has a squared end portion 29 on which handwheel 13 may be mounted by means of a correspondingly shaped central opening and fixed in position in any suitable manner.

The locking device 2 comprises two jaws 31 and 32 of generally semi-circular arcuate configuration which are provided with inwardly extending teeth 34 and which are pivotally connected to each other and to housing 1 by means of a pivot pin 33 extending through aligned bores in adjacent end portions of the two jaws and secured to an external projection 42 on housing 1, near the lower end thereof. At their opposite ends with respect to pivot pin 33, the two jaws 31 and 32 are movably connected to each other by a tightener 35 comprising a lever 36, at its one end pivotally connected to jaw 32 by means of a pivot pin 37, while its other end forms a manually operable handle. A link 38 has its one end connected to jaw 31 by means of a pivot pin 39, while its other end is pivotally coupled to lever 36 by means of a pivot pin 40 located at some distance from pivot pin 27 towards the handle end of the lever.

Near the lower end of the housing 1 a number of slot-like openings 41 are provided to receive the teeth 34 of jaws 31 and 32 displaceably therein and to permit the teeth to be brought into engagement under the edge flange 3 surrounding tapping hole 4 and out of such engagement by manual operation of lever 36.

A sealing ring may be provided in the internal groove at the lower end of the housing to facilitate a sealed connection between the housing 1 and the tapping hole 4. Suitable sealing means may also be provided between the cover 9 and the remaining part of the housing 1 as well as between cover 9 and key shaft 11.

When the device above described is to be used for instance for tapping of fluid from the container 5, housing 1 is mounted with its open end over tapping hole 4 and locked to flange 3 by means of tightener 35. Key 6 is then pushed towards plug 7 until key bit 15 reaches the bottom of the open cavity in the plug. By means of handwheel 13 the key is rotated in a counterclockwise direction until the key bit has been brought into contact with shoulders formed by projections 44 extending into said cavity from the surrounding side wall. Screw 14 is then manually rotated so as to press rod 22 downwardly until pins 18, which form an expansion holder for plug 7, have been brought into firm contact with the side walls of the cavity in plug 7.

Handwheel 13 may then be further rotated in counterclockwise direction to screw plug 7 out from hole 4, whereupon the plug may be axially withdrawn from said hole by means of key 6 to establish free communication between tapping hole 4 and discharge pipe 8. When plug 7 is to be reinserted in hole 4 it is pushed into contact with the upper edge of said hole by means of handwheel 13 which may then be rotated in clockwise direction to thread plug 7 into hole 4. The expandable pins 18, 19 serving to hold the plug on the key may be retracted by means of screw 14 to release the plug as soon as the plug has been threaded partially into hole 4. In any case, it may be advisable to retract said pins from their engagement with the plug before finally tightening the plug.

Figure 4:
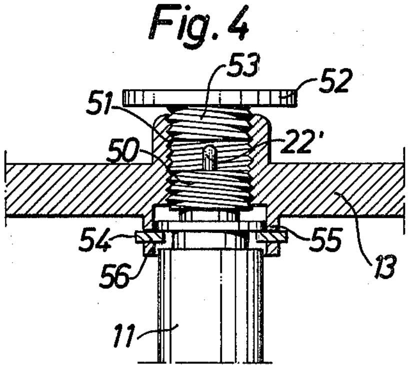
FIG. 4 is a partial view, partly in section, showing a modified tool.

In the embodiment above described screw 14 forms a separate manual control means for actuating the expandable plug holding means formed by pins 18, 19. In FIG. 4 there is shown a modified embodiment wherein the expandable plug holding means may be operated automatically in response to a relative rotation of a handwheel 13 with respect to plug 7. In said embodiment the operating rod 22 has an extension 22' projecting at the upper end of key shaft 11 which is provided with a left-hand threaded upper end portion 50 on which handwheel 13 is mounted by means of a correspondingly threaded central opening 51. A set screw 52 is threaded partially into opening 51 from the upper end of said opening. The lower end surface of the threaded shank 53 of screw 52 is adapted to cooperate with the end surface of extension 22' of rod 22. At its lower side handwheel 13 is provided with a projecting circular flange 55 in which a split locking washer 54 is mounted to engage in a circumferentially extending groove 56 on key shaft 11. The manner of operation of the key is as follows. When, upon insertion of the key bit 15 into the cavity in plug 7, the handwheel 13 is rotated in counterclockwise direction, it will be threaded in a downward direction on shaft portion 50, whereby screw 52 is brought into contact with extension 22' of rod 22 to press said rod downwardly in order to expand the plug holding pins 18, 19 into contact under pressure with the side wall of the cavity formed in the plug. Upon a limited rotation of the handwheel, washer 54 will contact the lower wall surface of groove 56 and prevent further relative rotation of the handwheel 13 with respect to the key shaft 11. Accordingly, when the handwheel is further rotated, key shaft 11 will rotate in unison therewith and, hence, plug 7 will be threaded out from hole 4. The desired contact pressure between pins 18, 19 and the plug may easily be set to a suitable value by means of screw 52.

The invention is not restricted to the embodiments above described. Thus, many modifications are possible within the scope of the invention. Especially, it should be noted that the expansion means need not consist of means adapted to move in a rectilinear manner, as is the case in respect of pins 18, 19. Instead, said means may be arranged for pivotal movement or any other suitable movement.

What is claimed is:

1. A device for use in connection with tapping off fluid from or filling fluid into a container through an internally threaded tapping or filling hole in the container, the hole being provided with an externally threaded generally cup-shaped plug having an outwardly open cavity in which a mechanism may be inserted for rotating the plug, said device comprising a bell-like housing which is adapted to be removably mounted with an open end thereof over the tapping or filling hole of the container and which is provided with an opening through which fluid may be fed into or discharged from the housing, and a tool for manually operating the plug from a position outside the housing, said tool comprising a shaft which extends slidably and rotatably through a portion of the housing opposite to the open end of the housing, handle means provided at an outer end of said shaft, and plug holding and operating means provided at an inner end of said shaft insertable into said cavity in the plug, said plug holding and operating means including expansion means expandable into frictional contact under pressure with portions of the side wall of the cavity of the plug upon insertion of the plug holding and operating means into said cavity.

2. A device according to claim 1, characterized by separate manually operable control means for actuating the expansion means.

3. A device according to claim 1, characterized by automatically operating control means for actuating the expansion means.

4. A device according to claim 3, characterized in that said automatically operating control means are arranged to actuate the expansion means in response to a limited relative rotation of the handle means of the tool with respect to the plug.

5. A device according to claim 1, wherein the tapping or filling hole is surrounded by an upstanding cylindrical collar having a flange, said device further comprising means for locking said bell-like housing to said collar.

6. A device for use in connection with tapping off fluid from a container through an internally threaded tapping or filling hole formed in the container, the container being provided with an externally threaded generally cup-shaped plug closing the hole and having an outwardly open cavity engageable by a mechanism for rotating the plug, said device comprising a housing supportable by portions of the container and removably mounted on the container with an open end thereof surrounding the tapping or filling hole of the container, said housing including an opening through which fluid may be fed into or discharged from the housing, and a passageway having a diameter at least as great as the diameter of the plug and extending within the housing from the open end thereof past said opening; and a tool for manually operating the plug from a position outside the housing, said tool comprising a shaft which extends slidably and rotatably through a portion of the housing opposite to the open end of the housing, handle means connected to an outer end of said shaft, plug holding and operating means connected to an inner end of said shaft frictionally engageable with the cavity of the plug, said plug holding and operating means including means expandable by movement of said handle means into frictional contact under pressure with portions of the side wall of the cavity of the plug to thereby releasably grip the plug so that the plug can be removed from the tapping or filling hole and moved to a position permitting flow between the tapping and filling hole and the opening in the housing.

7. A method of removing fluid from a container of the type having an internally threaded opening formed in the top of the container and an externally threaded generally cup-shaped plug closing the opening and having an outwardly open cavity for receiving a mechanism for rotating and removing the plug from the opening, the method using an open-ended housing having an internal passageway extending between the open-end and an opening formed in a wall of the housing, and a device having a rotatable and translatable expandable portion positionable in the housing and engageable with the wall of the plug cavity for frictionally engaging, rotating, and translating the plug, said method comprising:

releasably mounting the housing on the container with its open end surrounding the container opening;

moving the expandable portion of the device into the plug cavity;

rotating at least a portion of the device so that the expandable portion expands into contact with and frictionally engages the wall of the plug cavity;

rotating at least a portion of the device so that the frictionally engaged plug is rotated and removed from the container opening; and translating the device so that the plug is moved into a positon permitting fluid flow between the container and housing openings.

8. A method according to claim 7, wherein the same portion of the device is rotated to both expand the expandable portion and to rotate the plug.

* * * * *